United States Patent Office 2,982,413
Patented May 2, 1961

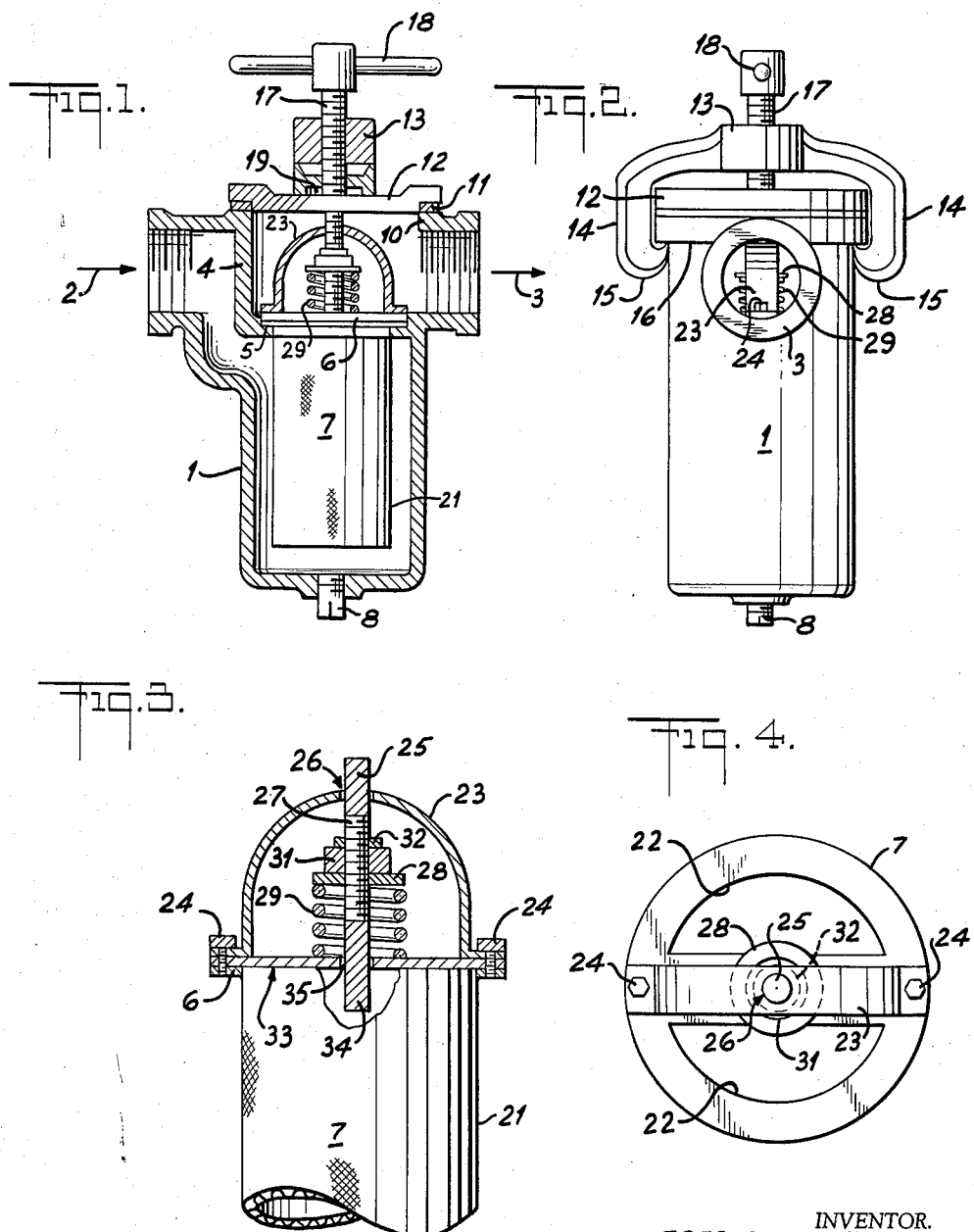

2,982,413

FILTER UNIT FOR LIQUIDS

Frederick Kraissl, Jr., 299 Williams Ave., Hackensack, N.J.

Filed Feb. 20, 1959, Ser. No. 794,721

8 Claims. (Cl. 210—131)

The present invention is directed to separators of a type commonly known as filters or strainers, depending upon the degree of separation required, more particularly to devices through which oil or other liquid flows in order to remove suspended matter therefrom. Still more particularly, the invention is directed to such devices used in connection with the flow of lubricating oil to lubricating systems for bearings of all types as used on internal combustion engines, pumps, compressors and turbines.

Filter devices of this kind wherein the filter element is enclosed in a casing and the liquid flows into the casing through the filter and out of the casing have been known and used. In most of the structures of the prior art, the filter unit was locked in position and when the filter became clogged, it was necessary to dismantle the assembly, remove the filter unit and clean or replace it with a new filter. It often happened that the clogging of the filter was unnoticed, which introduced a danger that the flow of oil or the pressure of the oil was either reduced or even stopped so that there was danger of the bearings being burned out and major damage inflicted on the devices requiring lubrication.

To overcome this disadvantage, it was proposed to mount the filter unit with spring tension to retain it in its normal position but so arranged that when the pressure of the flowing liquid became too great on the in-take side, it would overcome the pressure of the spring, lift the filter unit off of its seat and allow unfiltered liquid to by-pass the filter. Such an installation was effective for a time but because of changes in spring tension, the filter might be raised from its seat before the filter became clogged and uncleaned liquid allowed to pass unnecessarily. It is often desirable to adjust the pressure of the oil or other liquid flowing in the system but there was nothing in the prior art devices to accomplish a corresponding adjustment of the filter unit.

The present invention is intended and adapted to overcome the difficulties and disadvantages inherent in the prior art, it being among the objects of the present invention to so modify filter devices of the character described so as to allow the passage of liquid even though the filter has become clogged.

It is also among the objects of the present invention to devise a structure which will compensate for changes in pressure and which may be adjusted to operate under various predetermined degrees of pressure.

It is further among the objects of the present invention to provide a filter device of the character described wherein the mechanism is simple, the device is readily accessible for adjustment purposes and which is convenient to install and to replace.

In practicing the invention, there is provided a casing with inlets and outlets as usual, and a filter body through which the liquid may flow. Within the casing near the upper end thereof, there is an internal seat and the upper end of the filter body is provided with a flange which normally rests on the seat and comprises a seal to prevent liquid from flowing to the outlet without passing through the filter body.

In the upper part of the casing above the filter body, there is provided a spring preferably a coil spring with means for holding it to exert pressure upon the top of the filter body. To accomplish this, there is a threaded rod, one end of which is adapted to contact the top or cover of the casing. A nut or similar arangement is adapted to be threaded upwardly or downwardly on a member attached to the spring so as to alter the compression of the spring. Thereby the cover may be removed from the casing, the filter unit removed and the nut adjusted to the proper tension. It is a simple matter to replace the filter unit and the cover so that the device is now in operative position.

In the accompanying drawing constituting a part hereof and in which like reference characters indicate like parts, Fig. 1 is a transverse cross-sectional view of a filter device embodying the present invention, some parts being shown in elevation;

Fig. 2 is a side elevational view of the device as shown in Fig. 1;

Fig. 3 is an enlarged fragmentary view of the upper portion of the filter body, some parts being shown in section; and Fig. 4 is a top plan view of the device as shown in Fig. 3.

There is provided a casing 1 having an inlet 2 at one side adapted to be connected to a source of oil and an outlet 3 opposite said inlet which is adapted to be connected to a mechanism to be lubricated. A partition 4 forms a seat 5 upon which flange 6 of filter body 7 is adapted to rest. The top of filter 7 is fitted with ring 7' having a cross bar 33. A threaded opening at the bottom of the casing is closed by plug 8 which is used for cleaning purposes.

At the top of the casing is an opening 10 having a seat 11 on which a cover 12 rests. Clamp 13 swings on a bearing or may have arms 14 terminating in hooks 15, which engage the underside 16 of the upper part of casing 1. A clamping screw 17 operated by handle 18 is adapted to tighten clamp 13 to hold the cover in sealed position against stop 19.

The outer surface of filter body 7 is made of a porous material, such as screen or membrane, to allow liquid to flow therethrough and openings 22 in the top thereof allow the liquid to flow out of the filter to outlet 3. A bow-shaped guide and handle 23 has flattened portions 23' at the ends thereof held onto ring 7 by screws or bolts 24. Rod 25 is movable through opening 26 at the top of handle 23 so that when cover 12 is clamped into position, spring 29 will be compressed to hold the filter body on the seat. The middle portion of rod 25 is threaded as shown at 27 and it extends through an opening in plate 28 which in turn is secured to the top of coil spring 29, the lower end of said spring bearing upon the top of filter body 7 by bar 33. Nut 31 is threaded onto threaded portion 27 whereby the tension of the spring may be altered and a lock washer 32 is provided to hold nut 31 in adjusted position. Lower end 34 of rod 25 passes through opening 35 in bar 33. Bar 33 fixed to the filter handle assembly acts as a stop to limit the compression of the spring and as a means of transmitting spring pressure to filter body 7.

Rod 25 moves through hole 26 in handle 23 and a similar and opposite hole 35 in bar 33. These two holes act as guides for rod 25. As screw 31 is threaded down rod 25, more of it will emerge above handle 23, and when cover 12 is clamped into position, more pressure is exerted on spring 29 and bar 33, which transmits it to the filter body.

The filter handle assembly can be fixed to interchangeable separate filter bodies by various means such as slide clips, bayonet locks or similar devices, or it may be mounted with detachable screws or even permanently mounted. A detachable handle is to be preferred. The handle assembly comprised bow handle 23 and bar 33 and intermediate elements. These filter handle assemblies may be tested and adjusted for predetermined relief pressures like relief valves, and they may be snapped onto the filter bodies with the desired degree of separation.

What is claimed is:

1. In a filter unit having a hollow casing, an inlet and an outlet therein for the flow of liquid therethrough, a seat in said casing, a filter body, a flange at the upper edge of said filter body resting on said seat to seal off the outlet from said inlet, said filter body having passages for inflow and exit of liquid, a cover on said casing above said filter body, the improvement which comprises a coil spring resting on the top of said filter body, a threaded rod within said spring and extending upwardly therefrom, a plate on said rod and contacting the upper end of said spring, means for holding said rod in adjustable relation to said plate, means for preventing separation of said rod from said body, the upper end of said rod contacting the inner face of said cover.

2. A filter unit according to claim 1 characterized in the provision of an adjusting nut threaded on said rod and contacting said plate.

3. In a filter unit having a hollow casing, an inlet and an outlet therein for the flow of liquid therethrough, a seat in said casing, a filter body, a flange at the upper edge of said filter body resting on said seat to seal off the outlet from said inlet, said filter body having passages for inflow and exit of liquid, a cover on said casing above said filter body, the improvement which comprises a coil spring resting on the top of said filter body, a threaded rod within said spring and extending upwardly therefrom, a plate on said rod and contacting the upper end of said spring, means for holding said rod in adjustable relation to said plate, means for preventing separation of said rod from said body, the upper end of said rod contacting the inner face of said cover, a guide handle fixed on the top of said body, said rod being held in the area between the top of said body and said handle.

4. A filter unit according to claim 3 characterized in the presence of an opening in said handle, the upper end of said rod passing through said handle which acts as a guide for said rod, said rod extending above said handle.

5. A filter unit according to claim 4 characterized in said handle being bow-shaped, the ends thereof being mounted on said flange.

6. A filter unit according to claim 4 characterized in that the top of said body has an opening in alinement with said handle opening, the lower end of said rod passing through said body opening.

7. In a filter unit having a hollow casing, an inlet and an outlet therein for the flow of liquid therethrough, a seat in said casing, a filter body, a flange at the upper edge of said filter body resting on said seat to seal off the outlet from said inlet, said filter body having passages for inflow and exit of liquid, a cover on said casing above said filter body, the improvement which comprises a coil spring resting on the top of said filter body, a threaded rod within said spring and extending upwardly therefrom, a plate on said rod and contacting the upper end of said spring, means for holding said rod in adjustable relation to said plate, means for preventing separation of said rod from said body, the upper end of said rod contacting the inner face of said cover, an arcuate handle and a bar on the top of said body, the ends of said rod passing through said handle and bar and being guided thereby.

8. In a filter unit having a hollow casing, an inlet and an outlet therein for the flow of liquid therethrough, a seat in said casing, a filter body, a flange at the upper edge of said filter body resting on said seat to seal off the outlet from said inlet, said filter body having passages for inflow and exit of liquid, a cover on said casing above said filter body, the improvement which comprises a coil spring resting on the top of said filter body, a threaded rod within said spring and extending upwardly therefrom, a plate on said rod and contacting the upper end of said spring, means for holding said rod in adjustable relation to said plate, means for preventing separation of said rod from said body, the upper end of said rod contacting the inner face of said cover, said inlet and said outlet being located at the top of the casing, said seat being just below said inlet and said outlet, and said rod, spring, plate and a handle being located above said seat and in alinement with said inlet and said outlet.

References Cited in the file of this patent

UNITED STATES PATENTS

| | | |
|---|---|---|
| 511,798 | Rankine | Jan. 2, 1894 |
| 1,506,967 | Bosworth | Sept. 2, 1924 |
| 2,298,674 | Burhans | Oct. 13, 1942 |
| 2,352,315 | Gilbert | June 27, 1944 |
| 2,400,201 | Katcher | May 14, 1946 |